United States Patent
Christian et al.

(10) Patent No.: US 7,181,982 B2
(45) Date of Patent: Feb. 27, 2007

(54) CORIOLIS MASS FLOW MEASURING DEVICE

(75) Inventors: Matt Christian, Aesch (CH); Alfred Wenger, deceased, late of Neftenbach (CH); by Ida Wenger, legal representative, Neftenbach (CH); Michael Fuchs, Eschbach (DE); Wolfgang Drahm, Erding (DE)

(73) Assignee: Endress + Hauser Flowtec AG, Reinach (CH)

( * ) Notice: Subject to any disclaimer, the term of this patent is extended or adjusted under 35 U.S.C. 154(b) by 245 days.

(21) Appl. No.: 11/004,830

(22) Filed: Dec. 7, 2004

(65) Prior Publication Data

US 2006/0278019 A1  Dec. 14, 2006

Related U.S. Application Data

(60) Provisional application No. 60/546,183, filed on Feb. 23, 2004, provisional application No. 60/259,749, filed on Dec. 17, 2003.

(30) Foreign Application Priority Data

Dec. 12, 2003  (DE)  ................. 103 58 663
Feb. 17, 2004  (DE)  ............. 10 2004 007 889

(51) Int. Cl.
*G01F 1/84* (2006.01)
(52) U.S. Cl. ............................... 73/861.357
(58) Field of Classification Search .................. None
See application file for complete search history.

(56) References Cited

U.S. PATENT DOCUMENTS 4,524,610 A  6/1985 Fitzgerald et al.
(Continued)

FOREIGN PATENT DOCUMENTS

EP  0 831 306 A1  3/1998
(Continued)

*Primary Examiner*—Harshad Patel
(74) *Attorney, Agent, or Firm*—Bacon & Thomas, PLLC

(57) ABSTRACT

A Coriolis mass-flow/density meter includes at least one measuring tube through which a two, or more, phase medium during operation. A support means of the Coriolis mass-flow/density meter is fixed to an inlet end and an outlet end of the measuring tube and thus holds the tube such that it can oscillate. During operation, the measuring tube is made to oscillate with mechanical oscillations, especially bending oscillations, by means of an exciter arrangement. Additionally, the Coriolis mass-flow/density meter includes means for producing measurement signals ($x_{s1}$, $x_{s2}$) representing inlet end and outlet end oscillations of the measuring tube. An evaluation electronics produces an intermediate value ($X'_m$) derived from the measurement signals ($x_1$, $x_{s2}$) and representing a provisionally determined mass flow rate. The evaluation electronics also produces a second intermediate value ($X_2$) derived from the measurement signals ($x_{s1}$, $x_{s2}$), especially from a second measured value ($X_\rho$) representing a density of the medium and likewise produced in the evaluation electronics. The second intermediate value ($X_2$) represents a measure for an amount of a phase of the medium. Using the intermediate value ($X_2$), a correction value ($X_K$) for the first intermediate value ($X'_m$) is determined, with the correction value ($X_K$) being selected by means of the intermediate value ($X_2$) from a plurality of preset values stored in a table memory. Additionally, the evaluation electronics produces a measured value ($X_m$) representing a mass flow rate through use of the intermediate value ($X'_m$) and the correction value ($X_K$).

10 Claims, 5 Drawing Sheets

U.S. PATENT DOCUMENTS

| | | | | |
|---|---|---|---|---|
| 4,801,897 A | * | 1/1989 | Flecken | 73/861.357 |
| 5,069,074 A | * | 12/1991 | Young et al. | 73/861.356 |
| 5,648,616 A | * | 7/1997 | Keel | 73/861.356 |
| 6,006,609 A | * | 12/1999 | Drahm et al. | 73/861.357 |
| 6,513,393 B1 | | 2/2003 | Eckert et al. | |
| 6,651,513 B2 | | 11/2003 | Wenger et al. | |

FOREIGN PATENT DOCUMENTS

| | | |
|---|---|---|
| EP | 0 849 568 B1 | 6/1998 |
| WO | WO 00/04344 | 1/2000 |
| WO | WO 00/36379 | 6/2000 |
| WO | WO 00/71979 A1 | 11/2000 |

* cited by examiner

CORIOLIS MASS FLOW MEASURING DEVICE

FIELD OF THE INVENTION

The invention relates to a Coriolis mass-flow/density meter for a medium, particularly a medium of two or more phases, flowing in a pipeline, as well as to a method for producing a measured value representing mass flow.

BACKGROUND OF THE INVENTION

In the technology of process measurements and automation, for the measurement of physical parameters of a fluid flowing in a pipeline, parameters such as e.g. mass flow rate, density and/or viscosity, it is common to use such measuring devices, which, by means of a vibratory measurement pickup inserted into the course of the pipeline conducting the fluid and traversed by the fluid during operation, and a measuring and operating circuit connected thereto, create reaction forces in the fluid, forces such as e.g. Coriolis forces related to the mass flow rate, inertial forces related to the density, and frictional forces related to the viscosity, etc., and produce, derived therefrom, one or more measurement signals representing the current mass flow rate, the current viscosity and/or the current density of the fluid. Vibratory measurement pickups of this type are described e.g. in WO-A 03/076880, WO-A 02/37063, WO-A 01/33174, WO-A 00/57141, WO-A 99/39164, WO-A 98/07009, WO-A 95/16897, WO-A 88/03261, US 2003/0208325, U.S. Pat. No. B 6,513,393, U.S. Pat. No. B 6,505,519, U.S. Pat. No. 6,006,609, U.S. Pat. No. 5,869,770, U.S. Pat. No. 5,796,011, U.S. Pat. No. 5,602,346, U.S. Pat. No. 5,301,557, U.S. Pat. No. 5,259,250, U.S. Pat. No. 5,218,873, U.S. Pat. No. 5,069,074, U.S. Pat. No. 5,029,482, U.S. Pat. No. 4,876,898, U.S. Pat. No. 4,733,569, U.S. Pat. No. 4,660,421, U.S. Pat. No. 4,524,610, U.S. Pat. No. 4,491,025, U.S. Pat. No. 4,187,721, EP-A 553 939, EP-A 1 001 254 or EP-A 1 281 938.

For guiding the fluid, the measurement pickups include always at least one measuring tube, which is held, for example, in a tubular or box-shaped support frame. The measuring tube has a curved or straight tube segment, which is caused to vibrate—driven by an electromechanical exciter arrangement—during operation for producing the above-mentioned reaction forces. For registering vibrations, particularly vibrations at the inlet and outlet ends, of the tube segment, the measurement pickups additionally have electrophysical, sensor arrangements reacting to movements of the tube segment. In the case of Coriolis mass flow meters for application to a medium flowing in a pipeline, the measuring of the mass flow rate is accomplished, for example, by allowing the medium to flow through the measuring tube interposed in the pipeline and oscillating the tube during operation, whereby the medium experiences Coriolis forces. These forces, in turn, effect that the inlet and outlet regions of the measuring tube oscillate with phases which are shifted with respect to one another. The size of this phase shift serves as a measure for the mass flow rate. Then the oscillations of the measuring tube are registered by means of two oscillation sensors of the above-mentioned sensor arrangement separated from one another along the length of the measuring tube and are transformed into oscillation measurement signals, from whose mutual phase difference the mass flow rate is derived.

Already the above-referenced U.S. Pat. No. 4,187,721 mentions that also the instantaneous density of the flowing medium is usually measurable with Coriolis mass flow measuring devices, and, indeed, on the basis of a frequency of at least one of the oscillation measurement signals delivered by the sensor arrangement. Moreover, usually a temperature of the medium is also measured directly, in suitable manner, for instance by means of a temperature sensor arranged on the measuring tube. It can thus be assumed, without more, that, even when not expressly described, modern Coriolis mass-flow measuring devices enable measurement also of density and temperature of the medium, especially considering that these measurements can, in any case, always be used for compensation of measurement errors resulting from fluctuating fluid density; see, in this connection, especially the already mentioned U.S. Pat. No. 5,602,346, as well as WO-A 02/37063, WO-A 99/39164, or, also, WO-A 00/36379.

In the application of vibratory, measurement pickups, it has, however, been found, that, in the case of inhomogeneous media, especially fluids of two or more phases, the oscillation measuring signals derived from the oscillations of the measuring tube, especially also the mentioned phase shift, are subject to fluctuations to a considerable degree, in spite of keeping viscosity and density of the separate phases, as well as the mass flow rate, practically constant and/or appropriately taking them into consideration, such that, without remedial measures, the signals can become completely unusable for measuring the desired physical parameter. Such inhomogeneous media can, for example, be liquids, into which, as e.g. practically unavoidable in dosing- or bottling-processes, gas, especially air, present in the pipeline, is entrained, or from which a dissolved fluid, e.g. carbon dioxide, outgases and leads to foam formation. Another example of such inhomogeneous media is wet, or saturated, steam.

Already in U.S. Pat. No. 4,524,610, a possible cause of this problem for the operation of vibratory measurement pickups is indicated, namely the circumstance that inhomogeneities, such as gas bubbles brought into the measuring tube by the fluid, deposit on its inner wall and, so, can influence the oscillation to a considerable degree. For avoiding the problem, it is also proposed to install the measurement pickup such that the straight measuring tube extends essentially vertically, in order to prevent, as much as possible, an attachment of such interfering, especially gaseous, inhomogeneities. This is, however, a very special solution which cannot always be realized, without more, in industrial process measurement technology. On the one hand, the pipeline, into which the measurement pickup is to be inserted namely for this case, must, on occasion, be fitted to the measurement pickup, and not the reverse, a fact which can be rather difficult to explain to the user. On the other hand, the measuring tubes can, as already mentioned, be curved, so that the problem then cannot be solved by an adjustment of orientation in the installation. It has also been found, in this connection, that the mentioned corruptions of the measurement signal cannot really be significantly decreased by the use of a vertically installed, straight measuring tube. Moreover, the observed fluctuations of the so-produced measurement signal in the case of flowing fluid can, in any event, not be prevented in this manner.

Similar causes and their effects on the accuracy of measurement in the determining of mass flow rate are discussed, for example, also in JP-A 10-281846, WO-A 03/076880, along with U.S. Pat. Nos. 5,259,250, 5,029,482 or 6,505, 519. While a flow, respectively fluid, conditioning preceding the actual flow measurement is proposed in WO-A 03/076880 for lessening the measurement errors associated with fluids of two or more phases, JP-A 10-281846 and, also, U.S. Pat. No. 6,505,519, for example, each describe a correcting of the flow measurement, especially mass flow rate measurement, based on the oscillation measurement signals, for example using pre-trained, possibly even adaptive, classifiers for the oscillation measurement signals. The classifiers can be constructed, for example, in the form of a Kohonen map or a neural network, and can perform the correction either on the basis of a few parameters measured during operation, especially the mass flow rate and the density, along with further characteristics derived therefrom, or also by using an interval of the oscillation measurement signals encompassing one or more oscillation periods.

The use of such classifiers has, for example, the advantage, that, in comparison to conventional Coriolis mass flow/density meters, no, or only very slight, changes have to be made at the measurement pickup, be it with respect to the mechanical construction, the exciter arrangement, or the operating circuit controlling such, which are adjusted to accommodate the special application.

However, there is a significant disadvantage of such classifiers, among other things, in that, compared to conventional Coriolis mass flow measuring devices, considerable changes are required in the realm of measured value production, especially as regards the analog-to-digital converters and the microprocessors which are used. Thus, as described in the U.S. Pat. No. 6,505,519, such signal evaluation requires, for example in the digitizing of the oscillation measurement signals, which can have an oscillation frequency of around 80 Hz, a sampling rate of about 55 kHz, or more, in order to achieve sufficient accuracy. Said differently, the oscillation measurement signals must be sampled using a sampling ratio significantly above 600:1. On top of this, also the firmware stored and executed in the digital measuring circuit becomes correspondingly complex.

An additional disadvantage of such classifiers is to be seen in the fact that they must be trained and correspondingly validated for the measuring conditions actually present during operation of the measurement pickup, be it the conditions of installation, the fluid to be measured, and its usually variable properties, or other factors affecting the accuracy of measurement. Due to the high complexity of the interactions of all these factors, the training and its validation can finally usually only be done at the site and individually for each measurement pickup, this, in turn, leading to a considerable expense being associated with the start-up of the measurement pickup. Finally, it has also been found, that such classification algorithms, on the one hand because of the great complexity, and, on the other hand, because of the fact that, usually, a corresponding mathematical, physical model with technically relevant or understandable parameters is not explicitly present, classifiers exhibit a very low transparency and are, consequently, often difficult to place. Accompanying this, considerable resistance can arise with customers, with such acceptance problems especially occurring when it concerns classifiers involving a self-adapting mechanism, for instance a neural network.

SUMMARY OF THE INVENTION

An object of the invention is, therefore, to provide a corresponding Coriolis mass-flow meter able to measure mass flow rate even in the case of inhomogeneous, especially multi-phase, fluids. A further object is to provide a corresponding method for producing the measurement results.

For solving the first object, the invention resides in a Coriolis mass flow meter, especially a Coriolis mass-flow/density meter, for measuring a mass flow rate of a two, or more, phase medium flowing in a pipeline, which Coriolis mass flow meter comprises:
at least one measuring tube to be interposed in the pipeline and flowed-through by the medium during operation,
a support means, which is fixed to an inlet end and an outlet end of the measuring tube and thus holds such in an oscillation-permitting manner,
an exciter arrangement, which causes the measuring tube to execute mechanical oscillations, especially bending oscillations, during operation,
oscillation sensors for producing
a first oscillation measurement signal representing oscillations at the inlet end of the measuring tube, and
a second oscillation measurement signal representing oscillations at the outlet end of the measuring tube, as well as
a measuring and operating electronics, which delivers
an exciter current driving the exciter arrangement and
a mass flow rate measured value, which represents the mass flow rate to be measured,
wherein the measuring and operating electronics
produces a first intermediate value derived from the oscillation measurement signals and corresponding to the mass flow rate to be measured, as well as producing a correction value for the first intermediate value, and
determines the mass flow rate measured value on the basis of the first intermediate value and the correction value,
wherein the measuring and operating electronics produces the correction value by using at least a second intermediate value,
which is derived from at least one of the oscillation measurement signals and/or from the exciter current, and
which represents a measure for an amount of a phase of the medium,
wherein the measuring and operating electronics
has a table memory, in which a plurality of discrete preset values for the correction value are digitally stored, and
for determining the correction value, uses one of the preset values, which, on the basis of the second intermediate value, is read out of the table memory.

Additionally, the invention resides in a method for producing a measured value representing a physical, measured variable, especially a mass flow rate measured value representing a mass flow rate of a medium flowing in a pipeline, by means of a Coriolis mass flow meter, especially a Coriolis mass flow rate/density meter, which method includes the following steps:
Causing oscillations, especially bending oscillations, in a Coriolis mass flow meter measuring tube flowed through by the medium;
registering oscillations of the measuring tube and producing a first oscillation measurement signal representing an inlet-end oscillation and a second oscillation measurement signal representing an outlet-end oscillation;
developing through use of the two oscillation measurement signals a first intermediate value corresponding to the physical, measured variable, especially the mass flow rate;

determining a second intermediate value, especially with use of at least one of the two oscillation measurement signals;

producing a correction value for the first intermediate value by means of the second intermediate value, which represents a measure for an amount of a phase of the medium; and correcting the first intermediate value by means of the correction value;

wherein the correction value is determined using the second intermediate value and using a table memory, in which a plurality of discrete preset values for the correction value are digitally stored, by identifying the preset value, which is instantaneously to be used for the correction value, on the basis of the second intermediate value and reading such correction value ($X_K$) out of the table memory.

In a first embodiment of the Coriolis mass flow meter of the invention, the evaluation electronics delivers a mass flow rate measured value derived from the first and/or the second oscillation measurement signal and representing a mass flow rate of the medium.

In a second embodiment of the Coriolis mass flow meter of the invention, the evaluation electronics delivers a density, measured value representing a density of the medium and derived from the first and/or from the second oscillation measurement signal, and the evaluation electronics determines the correction value using the density measured value.

In a third embodiment of the Coriolis mass flow meter of the invention, the evaluation electronics determines, on the basis of the second intermediate value, a memory address for a preset value stored in the table memory and serving as the instantaneous correction value.

In a fourth embodiment of the Coriolis mass flow meter of the invention, the second intermediate value is determined on the basis of a scatter, determined at least for a predetermined time interval, of an amplitude of the exciter current, of an amplitude of the oscillation measurement signals, of an oscillation frequency of the oscillation measurement signals, of a measured density and/or of the first intermediate value.

In a first embodiment of the method of the invention, the method includes the following further steps:

Developing, on the basis of the measurement signals, a second measured value representing a density of the medium; and developing a correction value using the second measured value.

In a second embodiment of the method of the invention, the method includes the following further steps:

Allowing an exciter current to flow through an electromechanical exciter arrangement mechanically coupled with the measuring tube, for causing oscillations of the measuring tube; and determining a second intermediate value by taking the exciter current into consideration.

In a third embodiment of the of the invention, the second intermediate value represents at least one scatter, determined for a specified time interval, of a measured value determined for the medium flowing in the pipeline, especially of a measured mass flow rate, a measured density, or a measured viscosity, and/or a scatter, determined for a predetermined time interval, of an operational parameter of the Coriolis mass flow meter, especially of an amplitude of the oscillation measurement signals or an oscillation frequency of the oscillation measurement signals.

An advantage of the invention is that the correction value for correcting the first intermediate value, which provisionally represents the mass flow rate and is determined essentially in conventional manner, can, on the one hand, be determined initially comparatively simply, yet very accurately. On the other hand, the correction value can be adapted very rapidly to changing conditions in the medium to be measured, especially to changing concentration ratios, since only very few calculations are needed for its determination. Thus, comparing the Coriolis mass flow meter of the invention to a conventional Coriolis mass flow meter, only slight changes are carried out in the usually digital, evaluation electronics and these are essentially limited to the firmware, while both in the case of the measurement pickup and in the case of the production and preprocessing of the oscillation measurement signals, no, or only, if any, slight changes are required. Thus, for instance, even the oscillation measurement signals can still be sampled, after as before, with a usual sampling ratio of far below 100:1, especially about 10:1.

A further advantage of the invention is that, especially in contrast to the Coriolis mass flow measuring device described in U.S. Pat. No. B 6,505,519, always practically the same evaluation method can be performed for the determining of the measured value, since the evaluation method of the invention can be adapted to the instantaneous flow conditions in very simple manner by repeatedly new choice of the currently most suited coefficients from the table memory, despite significantly changing flow conditions in the measuring tube, for example due to a temporary two, or more, phase medium and/or a medium temporarily composed of a plurality of components, possibly also with varying concentrations of the separate phases and/or components.

BRIEF DESCRIPTION OF THE DRAWINGS

The invention and additional, advantageous embodiments will now be explained in further detail on the basis of examples of executions of the invention shown in the figures of the drawing. Equal parts are provided in all figures with equal reference characters; when clarity requires, already mentioned reference characters are omitted in subsequent figures.

DESCRIPTION OF THE PREFERRED EMBODIMENT

Figure 1:
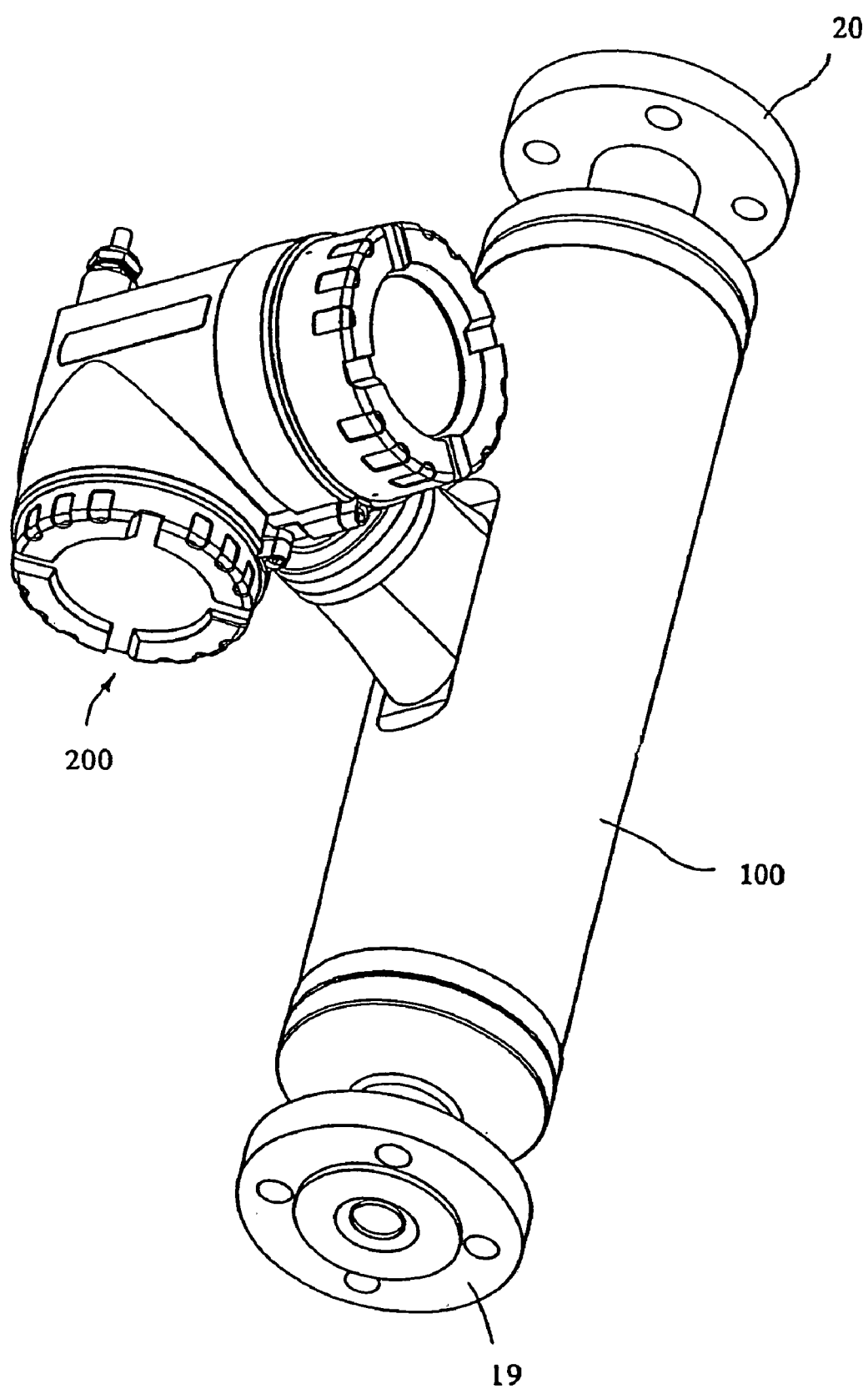
FIG. 1 shows in perspective side view a Coriolis mass flow measuring device serving to produce a mass-flow, measured value.
Figure 2:
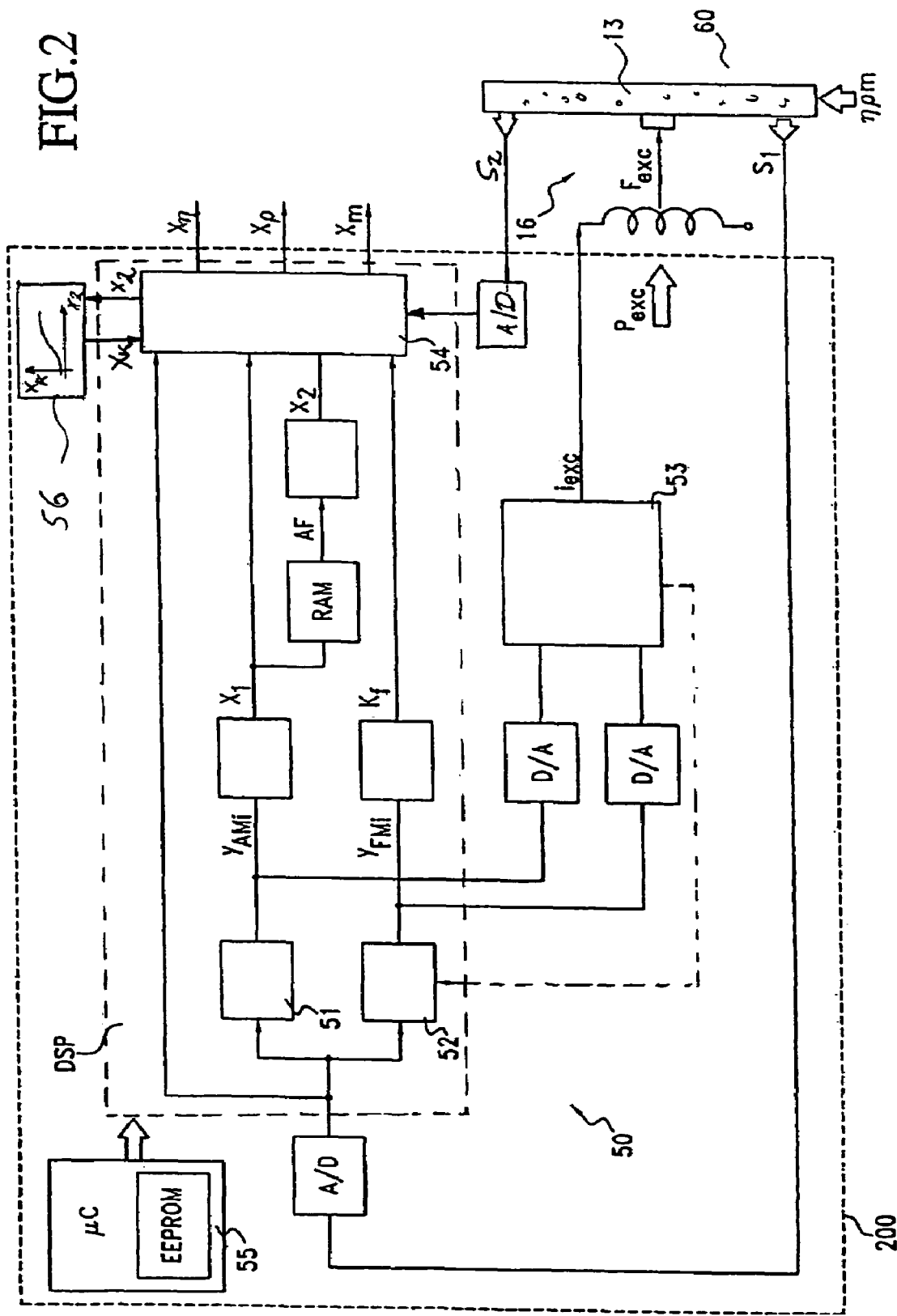
FIG. 2 shows schematically, in the form of a block diagram, a preferred embodiment of a measuring device electronics suited for the Coriolis, mass-flow-rate, measuring device of claim 1.
Figure 3:
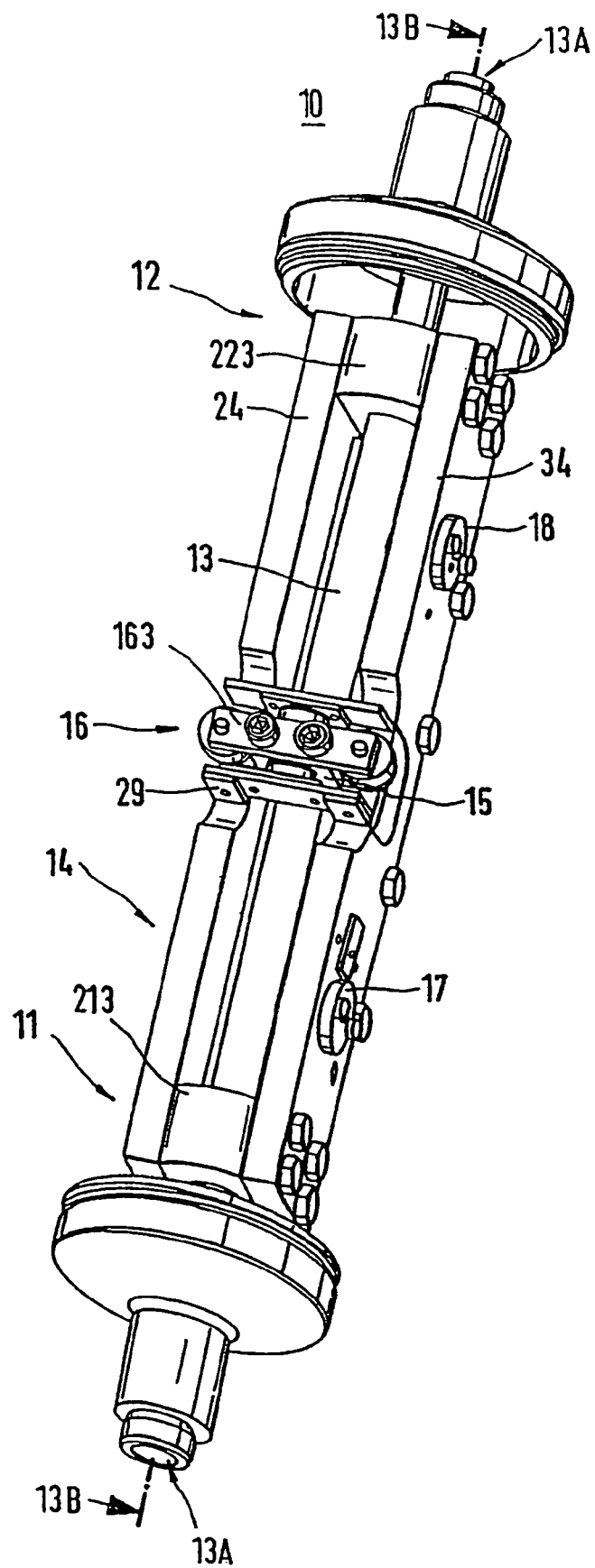
FIG. 3 shows, in a partially sectioned, perspective, first side view, an example of an embodiment of a vibratory measurement pickup suited for the Coriolis mass flow measuring device of FIG. 1.

FIG. 1 is a perspective illustration of a Coriolis mass flow measuring device 1 for registering a physical, measured variable—here a mass flow rate m—of a medium of two or more phases flowing in a pipeline (not shown) and for reflecting such in the form of a measured variable—here a mass-flow-rate, measured value $X_m$ instantaneously representing this measured variable—here the mass flow rate. The medium can be practically any flowable material, for example liquids, gases, or vapors, in which additionally to a main, or carrier, medium, inhomogeneities are introduced, thus undissolved parts of another medium having a consistency deviating from that of the carrier medium, for example solid particles and/or gas bubbles entrained in the liquid. For measuring the mass flow rate, the Coriolis mass flow measuring device 1 includes a vibratory measurement-pickup 10, as shown in FIG. 3, as well as a measuring device electronics 50, as shown in FIG. 2, electrically connected to the measurement pickup 10. For accommodating the measuring device electronics 50, an electronics housing 200 is additionally provided, mounted externally on the measurement pickup 10.

For registering the mass flow rate m, the measuring device electronics 50 excites the measurement pickup 10 during operation, in order to produce Coriolis forces in the fluid flowing through the measurement pickup 10. These forces are a function of the mass flow rate m and react measurably (i.e. they can be registered by sensor and can be evaluated electronically) on the measurement pickup 10. Besides producing a mass flow rate measured value $X_m$, the Coriolis mass flow measurement device serves additionally for measuring a density ρ of the flowing medium and for determining a density measured value $X_ρ$ instantaneously representing the density ρ.

Preferably, the measuring device electronics 50 is additionally so designed that it can, during operation of the Coriolis mass flow measuring device 1, exchange measurement and/or other operational data with a measured value processing unit superordinated thereto, for example a programmable logic controller (PLC), a personal computer and/or a work station, via a data transmission system, for example a field-bus system. Additionally, the measuring device electronics 50 is so designed that it can be fed from an external power supply, for example also over the above-mentioned field-bus system. For the case in which the vibration-type measuring device is to be coupled to a field bus, the measuring device electronics 50, especially a programmable one, has a corresponding communications interface for data communication, e.g. for the sending of the measurement data to a programmable logic controller or to a superordinated process control system.

Figure 4:
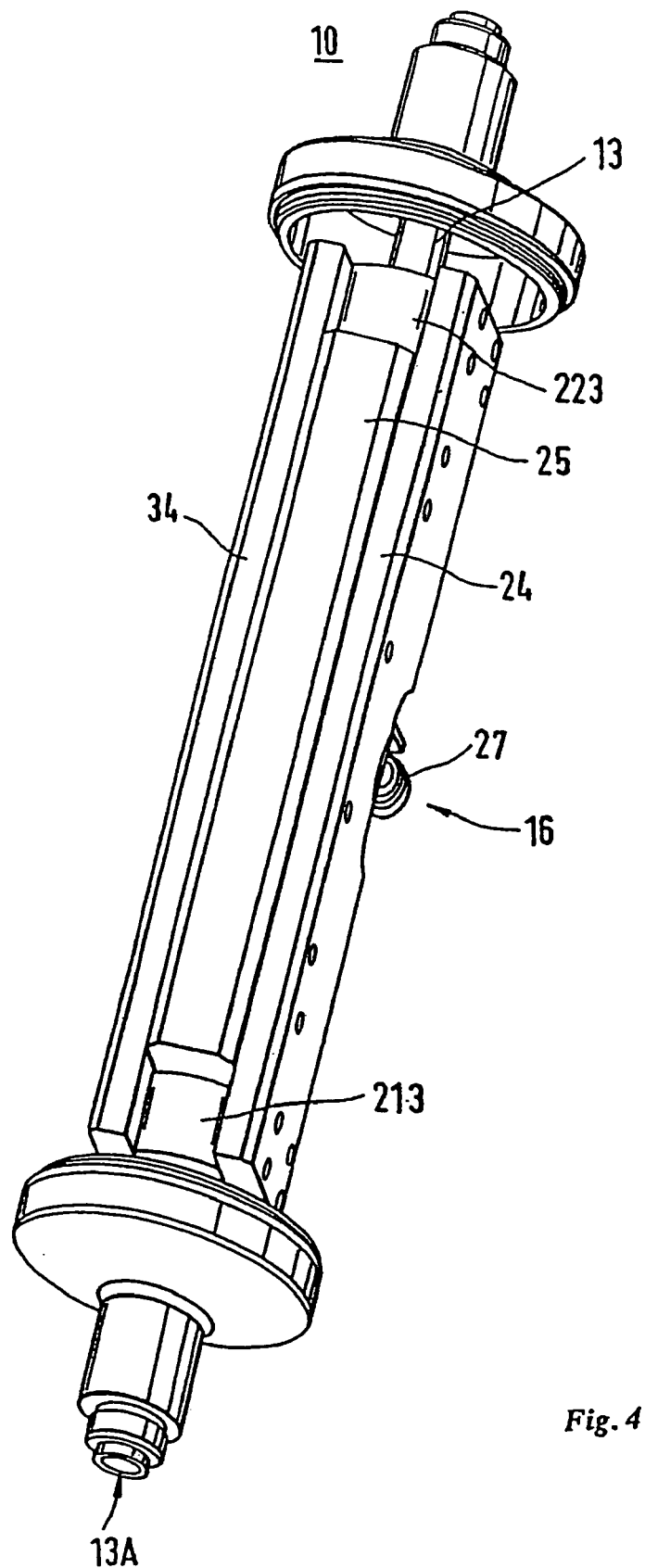
FIG. 4 shows the measurement pickup of FIG. 3 perspectively in a second side view.

FIGS. 3 and 4 show an example of an electrophysical, vibratory, transducer arrangement serving as measurement pickup 10. The structure and functioning of such a transducer arrangement is known, per se, to those skilled in the art and is described in detail also e.g. in U.S. Pat. No. 6,006,609.

For guiding the fluid to be measured, the measurement pickup 10 includes at least one measuring tube 13 having an inlet end 11, an outlet end 12, and a predeterminable measuring tube lumen 13A, elastically deformable during operation and of predeterminable nominal width. Elastic deformation of the measuring tube lumen 13A means here that, for producing fluid-internal, and, thus, fluid-characterizing, Coriolis forces, a physical shape and/or a physical position of the measuring tube lumen 13 is changed within an elastic range of the measuring tube 13, in predeterminable manner, cyclically, especially periodically; see e.g. U.S. Pat. No. 4,801,897, U.S. Pat. No. 5,648,616, U.S. Pat. No. 5,796,011 and/or U.S. Pat. No. 6,006,609. It is noted here additionally and expressly that, although the measurement pickup of the example of an embodiment includes only a single, straight measuring tube, the invention can be implemented, instead of with such a vibratory measurement pickup, with practically every one of the Coriolis mass flow measurement pickups described in the state of the art, especially such a measurement pickup using bending oscillations of a curved or straight measuring tube vibrating completely or at least partly in a bending oscillation mode. In particular, suited are, for example, vibratory measurement pickups having two, parallel, curved, measuring tubes traversed by the medium to be measured, such as are, for example, described in detail in EP-A 1 154 243, U.S. Pat. No. 5,301,557, U.S. Pat. No. 5,796,011, U.S. Pat. No. B 6,505,519, or WO-A 02/37063. Further, suitable forms of embodiment for such transducer arrangements serving as the measurement pickup 10 can be learned from e.g. WO-A 02/099363, WO-A 02/086426, WO-A 95/16 897, U.S. Pat. No. 5,602,345, U.S. Pat. No. 5,557,973 or U.S. Pat. No. 5,357,811. Especially suited as material for the utilized measuring tube 13 are e.g. titanium alloys. Instead of titanium alloys, however, other materials usually utilized for such measuring tubes, especially also for curved measuring tubes, can be employed, materials such as e.g. stainless steel, tantalum and zirconium.

The measuring tube 13, which communicates on the inlet side and outlet side in the usual manner with the pipeline supplying and extracting the fluid, is clamped for oscillation in a rigid, especially bending-stiff and torsionally-stiff, support frame 14. Instead of the box-shaped support frame 14 shown here, of course other suitable supporting means can be used, such as e.g. tubes extending parallel or coaxially to the measuring tube.

The support frame 14 is fixed to the measuring tube 13 on the inlet side by means of an inlet plate 213 and on the outlet side by means of an outlet plate 223, with the plates being pierced by suitable extension pieces of the measuring tube 13. Additionally, the support frame 14 has a first side plate 24 and a second side plate 34, which two side plates 24, 34 are each fixed to the inlet plate 213 and to the outlet plate 223, respectively, such that they extend essentially parallel to the measuring tube 13 and are arranged spaced from this and from one another; see FIG. 3. In this way, side surfaces of the two side plates 24, 34 facing one another are likewise parallel to one another. A longitudinal strut 25 is fixed to the side plates 24, 34, spaced from the measuring tube 13, and serves as a countermass hiding the oscillations of the measuring tube 13. The longitudinal strut 25 extends, as is shown in FIG. 4, essentially parallel to the entire oscillatable length of the measuring tube 13; this is, however, not compulsory, because the longitudinal strut 25 can, of course, if necessary, also be provided in a shorter embodiment. The support frame 14 with the two side plates 24, 34, the inlet plate 213, the outlet plate 223, and the longitudinal strut 25, has, as a consequence, a longitudinal center of gravity line that extends essentially parallel to a measuring tube central axis 13B virtually connecting the inlet end 11 and the outlet end 12.

In FIGS. 3 and 4, the heads of the illustrated screws indicate that the mentioned fixing of the side plates 24, 34 to the inlet plate 213, the outlet plate 223 and the longitudinal strut 25 can occur by screw connections; however, other suitable means of securement known to those skilled in the art can also be used.

For the case where the measurement pickup 10 is to be assembled releasably with the pipeline, the measuring tube 13 is provided on the inlet end with a first flange 19 and on the outlet end with a second flange 20, see FIG. 1; instead of the flanges 19, 20, however, e.g. other pipeline connection pieces can be provided for releasable connection with the pipeline, such as e.g. the so-called TRI-CLAMP connections indicated in FIG. 3. If necessary, the measuring tube 13 can also be connected directly with the pipeline, for instance by means of welding or brazing, etc.

For producing the mentioned Coriolis forces, the measuring tube 13 is caused during operation of the measurement pickup 10 to vibrate in the so-called useful mode, at a predeterminable oscillation frequency, especially a natural resonance frequency, driven by an electromechanical exciter apparatus 16 coupled with the measuring tube. As a consequence, the measuring tube 13 is elastically deformed in predeterminable manner. The natural resonance frequency here also depends on a density of the fluid. In the illustrated example of an embodiment, the vibrating measuring tube 13, as is usual for such transducer arrangements of the bending oscillation type, is deflected physically, especially laterally, out of a static rest position. The same is essentially the case for those transducer arrangements where one, or more, curved measuring tubes execute cantilever oscillations about an imaginary longitudinal axis connecting the respective inlet and outlet ends, as well as for those transducer arrangements where one or more straight measuring tubes execute only bending oscillations in a single oscillation plane.

The exciter apparatus 16 serves for producing an exciting force $F_{exc}$ acting on the measuring tube 13, by conversion of an electrical exciting power $P_{exc}$ supplied from the measuring device electronics 50. The exciting power $P_{exc}$ serves essentially only for compensating for the power fraction drained from the oscillating system by mechanical and fluid-internal friction. For achieving a highest possible efficiency, the exciter power $P_{exc}$ is adjusted as exactly as possible, such that the oscillations of the measuring tube 13 are essentially kept in the useful mode, e.g. that of a fundamental resonance frequency.

Figure 5:
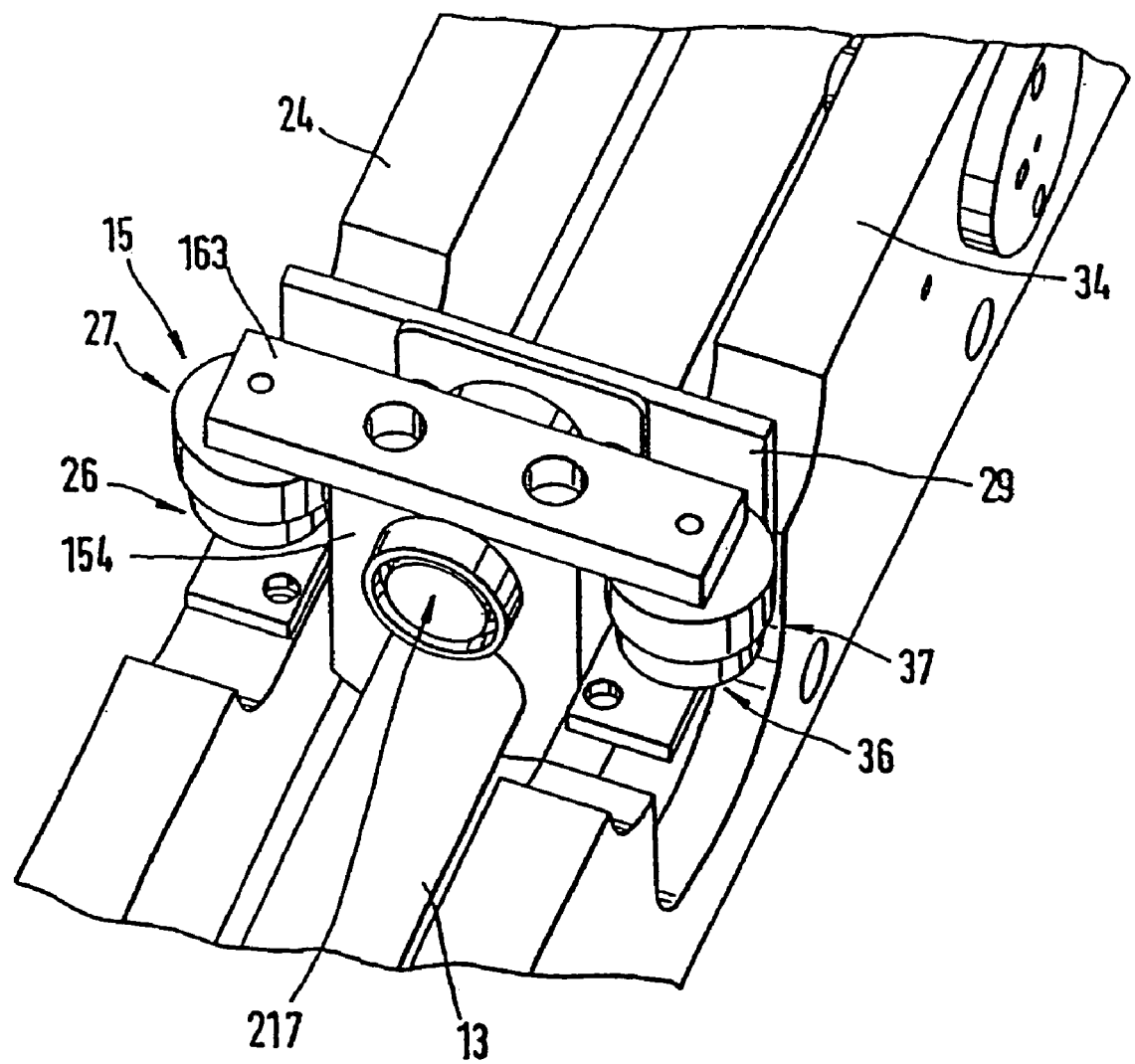
FIG. 5 shows an example of an electromechanical exciting arrangement for the measurement pickup of FIG. 3.

For the purpose of transferring the exciting force $F_{exc}$ onto the measuring tube 13, the exciter apparatus 16 has, as illustrated in FIG. 5, a rigid, electromagnetically and/or electrodynamically driven, lever arrangement 15 involving a cantilever 154 fixed on the measuring tube 13 securely against bending and a yoke 163. The yoke 163 is fixed to an end of the cantilever 154 far from the measuring tube 13 likewise securely against bending, and, indeed, such that it is arranged above the measuring tube 13 and transversely thereto. The cantilever 154 can be e.g. a metal panel, which accommodates the measuring tube 13 in a bore. For further suitable embodiments of the lever arrangement, reference is made here to the already mentioned U.S. Pat. No. 6,006,609. The lever arrangement is T-shaped and so arranged (see FIG. 5) that it acts on the measuring tube 13 about halfway between the inlet and outlet ends 11, 12, whereby the measuring tube, during operation, experiences its largest lateral excursion at the halfway point.

For driving the lever arrangement 15, the exciter apparatus 16 includes, as shown in FIG. 5, a first exciter coil 26 and an associated, first permanent magnet armature 27, together with a second exciter coil 36 and an associated, second permanent magnetic armature 37. The two exciter coils 26, 36, which are preferably connected electrically in series, are fixed on both sides of the measuring tube 13 below the yoke 163 on the support frame 14, especially releasably, such that they can interact with their associated armatures 27, 37 during operation. The two exciter coils 26, 36 can, if necessary, of course also be connected in parallel. As shown in FIGS. 3 and 5, the two armatures 27, 37 are fixed to the yoke 163 spaced from one another such that, during operation of the measurement pickup 10, the armature 27 is essentially traversed by a magnetic field of the exciter coil 26, and the armature 37 is essentially traversed by a magnetic field of the exciter coil 36, such that they are moved on the basis of resulting electrodynamic and/or electromagnetic force effects. The movements of the armatures 27, 37 produced by means of the magnetic fields of the exciter coils 26, 37 are transferred by the yoke 163 and the cantilever 154 onto the measuring tube 13. These movements of the armatures 27, 37 are so designed that the yoke 163 is moved from its rest position alternatingly in the direction of the side plate 24 and then in the direction of the side plate 34. A corresponding rotational axis of the lever arrangement 15 parallel to the already mentioned measuring tube central axis 13B can extend e.g. through the cantilever 154.

The support frame 14 includes, additionally, a holder 29 for the electromechanical exciter apparatus 16. Holder 29 is connected, especially releasably, with the side plates 24, 34. In particular, holder 29 holds exciter coils 26, 36 and, where applicable, individual components of a magnetic brake apparatus described below.

Finally, the measuring device 1 has a measurement pickup housing 100 surrounding the measuring tube and support frame, for protection against damage. The measurement pickup housing 100 is provided with a neck-like transition piece, on which the electronics housing 200 is fixed for housing the measuring device electronics 50. See FIG. 1.

In the case of the measurement pickup 10 of the illustrated example of an embodiment, the lateral excursions of the vibrating measuring tube 13, clamped securely at the inlet end 11 and the outlet end 12, result simultaneously in an elastic deformation of its measuring tube lumen 13A essentially over the entire length of the measuring tube 13. Furthermore, the torque caused in the measuring tube 13 by the action of the lever arrangement 15 thereon results at least sectionally in a twisting of the measuring tube 13 about the measuring tube central axis 13B, so that the measuring tube 13 oscillates in a mixed, bending oscillation, torsion mode, which serves as the useful mode. The twist of the measuring tube 13 can, in this case, form such that a lateral excursion of the end of the cantilever 154 far from the measuring tube 13 is either in the same direction as, or in the opposite direction to, the lateral excursion of the measuring tube 13. The measuring tube 13 can, thus, execute torsional oscillations in a first bending oscillation, torsion mode corresponding to the same direction case or in a second bending oscillation, torsion mode corresponding to the opposition direction case. Then, in the case of the measurement pickup 10 of the illustrated example of an embodiment, the natural, fundamental resonance frequency of the second bending oscillation, torsion mode is, at 900 Hz, approximately twice as high as that of the first bending oscillation, torsion mode.

For the case, that the measuring tube 13 is to execute, during operation, oscillations only in the second bending oscillation, torsion mode, a magnet braking arrangement 217, operating on the eddy current principle, is integrated in the exciter apparatus 16 for the purpose of stabilizing the position of the mentioned axis of rotation. Thus, by means of the magnetic braking arrangement 217, it can be assured that the measuring tube 13 oscillates always in the second bending oscillation, torsion mode and, consequently, possible external disturbing influences do not lead to a spontaneous change into another mode, especially not into the first, bending oscillation, torsion mode. Details of such a magnetic braking arrangement are described in detail in U.S. Pat. No. 6,006,609.

It is to be noted at this point that, when the measuring tube 13 is deflected in this way in the second bending oscillation, torsion mode, the imaginary measuring tube central axis 13B becomes slightly deformed and, consequently, sweeps with the oscillations not a plane but, instead, a weakly warped surface. Additionally, a locus of the halfway point of the measuring tube central axis lying in this surface has the smallest curvature of all loci described by points on the measuring tube central axis.

For detecting the deformation of the measuring tube 13, the measurement pickup 10 additionally has a sensor arrangement 60, which produces by means of at least one, first sensor 17 reacting to vibrations of the measuring tube 13 a first oscillation measurement signal s1, especially an analog signal, representing these vibrations. The sensor 17 can e.g. be in the form of a permanent magnet armature, which is fixed on the measuring tube 13 and interacts with a sensor coil mounted on the support frame 14. As sensor 17, especially those are suited which, based on the electrodynamic principle, register a velocity of the excursions of the measuring tube 13. However, it is also possible to use acceleration-measuring, electrodynamic, or even travel-measuring, resistive or optical sensors. Of course, other sensors known to those skilled in the art and suited for the detection of such vibrations can be used. The sensor arrangement 60 includes, additionally, a second sensor 18, especially one identical to the first sensor 17. The second sensor 18 delivers a second oscillation measurement signal s2, likewise representing vibrations of the measuring tube 13. The two sensors 17, 18 in this embodiment are separated from one another along the measuring tube 13, especially at an equal distances from the halfway point of the measuring tube 13, arranged in the measurement pickup 10 such that sensor arrangement 60 registers vibrations of the measuring tube 13 at points both toward the inlet end and toward the outlet end, which are reflected in the corresponding oscillation measurement signals, respectively, s1 and s2. The first and, if used, the second oscillation measurement signals s1 and s2, which usually each have a signal frequency corresponding to an instantaneous oscillation frequency of the measuring tube 13, are, as shown in FIG. 2, fed to the measuring device electronics 50.

For causing the measuring tube 13 to vibrate, the exciter apparatus 16 is fed by means of a likewise oscillating, exciter current $i_{exc}$ of adjustable amplitude and adjustable exciter frequency $f_{exc}$, such that the exciter coils 26, 36 are traversed by such during operation and, in corresponding manner, the magnetic fields required for moving the armatures 27, 37 are produced. The exciter current $i_{exc}$ can be e.g. sinusoidal or rectangular. The exciter frequency $f_{exc}$ of the exciter current $i_{exc}$ is, in the case of the illustrated example of an embodiment of the measurement pickup, preferably so chosen and adjusted that the laterally oscillating measuring tube oscillates, to the extent possible, exclusively in the second bending oscillation, torsion mode.

For producing and adjusting the exciter current $i_{exc}$, the measuring device electronics 50 includes a corresponding driver circuit 53, which is controlled by a frequency adjustment signal $y_{FM}$ representing the desired exciter frequency $f_{exc}$ and by an amplitude adjustment signal $y_{AM}$ representing the desired amplitude of the exciter current $i_{exc}$. The driver circuit can implemented e.g. by means of a voltage-controlled oscillator and a voltage-to-current converter connected downstream therefrom; instead of an analog oscillator, however, also e.g. a numerically-controlled, digital oscillator can be used for adjusting the exciter current $i_{exc}$.

Integrated in the measuring device electronics 50 for producing the amplitude adjustment signal $y_{AM}$ is e.g. an amplitude control circuit 51, which actualizes the amplitude adjusting signal $y_{AM}$ on the basis of the instantaneous amplitude of at least one of the two sensor signals $s_1$, $s_2$ and on the basis of an appropriate constant, or variable, amplitude reference value $W_1$; where applicable, also an instantaneous amplitude of the exciter current $i_{exc}$ can be introduced for generating the amplitude adjustment signal YAM. Such amplitude control circuits are likewise known to those skilled in the art. As an example for such an amplitude control circuit, reference is made to Coriolis mass flow meters of the series "PROMASS I". Their amplitude control circuit is preferably designed such that the lateral oscillations of the measuring tube 13 are controlled to a constant (thus also density ρ independent) amplitude.

Furthermore, the frequency adjustment signal $y_{FM}$ can be delivered from a corresponding frequency control circuit 52, which generates such e.g. on the basis of at least the sensor signal $s_1$ as well as on the basis of a frequency-representing, direct voltage serving as a corresponding frequency reference value $W_2$.

Preferably, the frequency control circuit 52 and the driver circuit 53 are connected together into a phase-locked loop, which is used, in manner known to those skilled in the art, to tune the frequency adjustment signal $y_{FM}$ continuously to an instantaneous resonance frequency of the measuring tube 13, on the basis of a phase difference measured between at least one of the sensor signals $s_1$, $s_2$ and the desired, or measured, exciter current $i_{exc}$. The construction and use of such phase-locked loops for driving measuring tubes at one of their mechanical resonance frequencies is described in detail in e.g. U.S. Pat. No. 4,801,897. Of course, other frequency control circuits known to those skilled in the art, such as e.g. one of those described in U.S. Pat. No. 4,524,610 or U.S. Pat. No. 4,801,897, can be used. Furthermore, reference is made to the already-mentioned "PROMASS I" series with respect to an application of such frequency control circuits for measurement pickups of the described type. Other circuits suited as driver circuits can be taken from, for example, U.S. Pat. No. 5,869,770 or U.S. Pat. No. 6,505,519.

According to a further embodiment of the invention, the amplitude control circuit 51 and the frequency control circuit 52 are implemented by means of a digital signal processor DSP provided in the measuring device electronics 50 and by means of program code correspondingly provided, and running, in the digital signal processor DSP. The program code can be stored persistently or even permanently e.g. in a non-volatile memory EEPROM of a microcomputer 55 controlling and/or monitoring the signal processor and can be loaded upon startup of the signal processor DSP into a volatile data memory RAM of the measuring device electronics 50, integrated e.g. in the signal processor DSP. Signal processors suitable for such applications are e.g. those of type TMS320VC33, available from the firm Texas Instruments.

It is practically self-evident that at least the sensor signal $s_1$ and, where applicable, also the sensor signal $s_2$ need to be converted into corresponding digital signals by means of corresponding analog-to-digital converters A/D for a processing in the signal processor DSP; see, in this connection, especially EP-A 866,319. Should such be required, adjustment signals issued from the signal processor, such as e.g. the amplitude adjustment signal YAM or the frequency adjustment signal $y_{FM}$, can be correspondingly converted from digital to analog.

As shown in FIG. 2, the oscillation measurement signals $x_{s1}$, $x_{s2}$ are, furthermore, fed to a measuring circuit 21 of the measuring device electronics. The measuring circuit 21 can be one of the conventional, especially digital, measuring circuits that determine mass flow rate on the basis of the oscillation measurement signals $x_{s1}$, $x_{s2}$; see, in this connection, especially the above-mentioned WO-A 02/37063, WO-A 99/39164, U.S. Pat. No. 5,648,616, U.S. Pat. No. 5,069,074. Of course, other measurement circuits known to those skilled in the art to be suited for Coriolis mass flow measuring devices can be used, circuits which measure, and appropriately evaluate, phase and/or timing differences between the oscillation measurement signals $x_{s1}$, $x_{s2}$. Advantageously, the measuring circuit 21 can likewise be implemented by means of the signal processor DSP.

The measuring circuit 21, at least partially embodied as a flow calculator, or computer, serves for determining, in the manner known per se to those skilled in the art, from a phase difference detected between the two, if need be, first suitably conditioned, oscillation measurement signals $x_{s1}$, $x_{s2}$, a measured value corresponding to the mass flow rate to be measured. As already mentioned above, inhomogeneities in the flowing medium, for instance gas bubbles and/or solid particles entrained in liquids, can lead to a measured value determined in conventional manner, assuming a homogeneous medium, that does not match the actual mass flow rate with sufficient accuracy, i.e. the measured value must be appropriately corrected; this first determined, measured value, which provisionally represents the mass flow rate or at least corresponds to it, which, in the simplest case, can be the phase difference existing, and detected, between the oscillation measurement signals $x_{s1}$, $x_{s2}$, is, consequently referenced in the following as a first intermediate value $X'_m$. From this first intermediate value $X'_m$, the evaluation electronics 21 then finally derives a mass flow rate measured value $X_m$, which does represent the mass flow rate with sufficient accuracy.

There is already discussion in the state of the art concerning this, that such inhomogeneities lead, depending on the principle of measurement, first and foremost, to a change in the density measured for the flowing medium. Further investigations on the part of the inventors led, additionally, however, to the surprising finding that the correction of the intermediate value $X'_m$, contrary to the explanations in the state of the art, can, on the one hand, be done using few, very easily determinable, correction factors, which can be directly derived from the flow parameters determined by Coriolis mass flow meters as measurements, especially the measured density and/or the—here provisionally—measured mass flow rate, and/or from the operating parameters usually directly measured by Coriolis mass flow meters during operation, especially the measured oscillation amplitudes, oscillation frequencies and/or the exciter current. On the other hand, the correction can performed using the first-determined density measured value $X_\rho$ and the first-determined intermediate value $X'_m$ with a computational burden which is very small, compared to the above-mentioned, more complex computing methods.

For the accurate measurement of the mass flow rate, a corresponding correction value $X_K$ is derived from the intermediate value $X'_m$ by means of the evaluation electronics 2 and the mass flow rate, measured value $X_m$ calculated, especially digitally, using the correction value $X_K$ on the intermediate value $X'_m$. For example, the correction of the essentially conventionally determined, intermediate value $X'_m$ can occur on the basis of the formula $$X_m = (1+X_K) \cdot X'_m. \tag{1}$$

According to the invention, for determining the instantaneously suitable correction value $X_K$, a second intermediate value $X_2$ is determined during operation. This second value represents a measure for the amount, especially a percentage, or relative, amount, at which a phase, for example a gas phase, or a liquid phase, is present in the medium and/or it represents a deviation of the fluid to be measured from ideal homogeneity, or a degree of the inhomogeneity. The correction value $X_K$ is, thus, derived from a concentration of the inhomogeneities measured in operation of, or communicated to, the Coriolis mass flow measuring device.

According to the invention, the evaluation electronics determines the correction value $X_K$ starting from the intermediate value $X_2$ practically directly, in that a unique relationship between the actual intermediate value $X_2$ and the correction value $X_K$ corresponding thereto is mapped, especially programmed, in the evaluation electronics. To this end, the evaluation electronics additionally has a table memory 56, in which a plurality of preset (for instance during the calibration of the Coriolis mass flow measuring device), digital correction values $X_{K,i}$ are stored. The appropriate correction value $X_{K,i}$ is directly accessed by the measuring circuit using a memory address derived by means of the instantaneously valid, second intermediate value $X_2$. Suitable examples of components for the table memory 56 are programmable, read-only memories, thus a FPGA (field programmable gate array), an EPROM or an EEPROM. The correction value $X_K$ can, in such case, e.g. be determined in simple manner by comparing the instantaneously determined intermediate value $X_2$ with corresponding values pre-stored for the intermediate value $X_2$ in the table memory and reading out, for use in the further calculations of the evaluation electronics 2, that correction value $X_{K,i}$ associated with the pre-stored value coming closest to the intermediate value $X_2$. The use of such a table memory for determining the correction value $X_K$ has, among others, the advantage that the correction value $X_K$ is very rapidly available during runtime following calculation of the intermediate value $X_2$.

Along with the determining of the correction value $X_K$, the intermediate value $X_2$ can additionally be used advantageously for signalling, e.g. on site or in a remote control room, in a visually perceptible manner, the degree of the inhomogeneity of the fluid, or measured values derived therefrom, such as e.g. a percentage air content in the fluid or a volume-, quantity- or mass-fraction of solid particles entrained in the fluid.

Based on evaluation of a number of amplitude versus time curves of the oscillation measurement signals, as well as of the exciter current $i_{exc}$, which were recorded during measurements performed on liquids disturbed in predetermined manner, it was found, additionally, that both the exciter current $i_{exc}$ and the oscillation measurement signals $x_{s1}$, $x_{s2}$, can, on the one hand, fluctuate to a considerable degree over time, despite conditions remaining essentially constant, thus e.g. in the case of steadily flowing liquid of constant density and viscosity and with an entrained air bubble fraction largely held constant. On the other hand, however, it was also determined, that the practically unpredictably fluctuating exciter current $i_{exc}$, respectively the oscillation measurement signals $x_{s1}$, $x_{s2}$, especially their amplitudes, each can exhibit an empirical standard deviation, respectively an empirical scatter sp, which strongly correlates with the degree of the inhomogeneity. Accordingly, the intermediate value $X_2$ is determined, in one embodiment of the invention, as a function of the scatters sp of the flow and/or operational parameters chosen for the real application, i.e. the following should hold:

$$X_2 = f(s_p). \quad (2)$$

In such case, the intermediate value $X_2$ can be determined both on the basis of the scatter of a single flow and/or operational parameter, for example the exciter current, as well as on the basis of a combination of plural flow and/or operational parameters.

The calculation of the particular scatter $s_p$ for the purpose of determining the intermediate value $X_2$ can occur during operation of the Coriolis mass flow measuring device 1 on the basis of a sampling AF of m measured values $a_i$ of the chosen flow parameter, for example the intermediate value $X_K$ or the density measured value $X_\rho$, or the chosen operational parameter, for example the exciter current $i_{exc}$ or one of the oscillation measurement signals $x_{s1}$, $x_{s2}$, or the like, according to the known function $$s_p = \frac{1}{m-1} \sum_{i=1}^{m} (a_i - \overline{a})^2, \quad (3)$$

where a (i.e., a-bar) corresponds to the average value estimated for the sampling AF. The individual measured values $a_i$ can be digitally stored for this e.g. in the volatile data memory RAM. In case required, the sampling AF serving for determining the scatter $s_p$ can be e.g. also a sampling sequence of an amplitude curve of an analog-measured, operational parameter, for example a section of a digitized envelope curve of the exciter current $i_{exc}$ or of one of the oscillation measurement signals $x_{s1}$, $x_{s2}$ stored in corresponding manner.

Investigations have shown that, for a sufficiently accurate estimation of the scatter s, samplings AF of only relatively small size, m, e.g. of, in each case, about 100 to 1000 measured values $a_i$, are required, wherein the individual measured values also need to be sampled only within a very narrow sampling window, or time interval, of about 1 to 2 seconds. Accordingly, also only a relatively low sampling frequency of around a few kilohertz, e.g. about 1 to 5 kHz, would be sufficient.

It has, further, been found that the intermediate value $X_K$ can be determined for numerous applications as the solution of simple, especially linear or quadratic, functions having the intermediate value as argument, so that some few, wet-calibrated (thus with use of appropriate test fluids) measurement points are sufficient for determining the preset values to be stored for the intermediate value $X_K$, in order then to be able to complete the table memory with the remaining preset values by simple interpolation and/or extrapolation methods between these known points determined experimentally by calibration, e.g. using the method of least squares, practically without further calibration measurements. For some applications, however, it has proved advantageous to calculate the preset values for the intermediate value $X_K$ as a solution of an arc tangent function or a sigmodal function. For reducing the amount of calculation, the determination of the preset values for the intermediate value $X_K$ can advantageously be performed in the framework of a type calibration, in which few actually measured and, if need be, also calculated preset values are adopted for Coriolis mass flow rate measuring devices of equal type.

According to a further development of the invention, a deviation $\Delta\rho$ of the density $\rho$ of the medium from a predetermined reference density is determined by means of the evaluation electronics on the basis of the density measured value $X_\rho$ and on the basis of an initially determined, or contemporaneously measured, reference density value $K_\rho$, which can be stored, for example, as a constant value at the startup of the Coriolis mass flow meter or transmitted, during operation, from the exterior to the Coriolis mass flow meter. For producing the correction value $X_K$, the so-determined deviation $\Delta\rho$ is combined with the second intermediate value $X_2$ according to the functional relationship $$X_K = \Delta\rho \cdot X_2. \quad (4).$$

The reference density value $K_\rho$ can be input manually, for example on site or from a remote control room, based on knowledge of the fluid to be measured, or transmitted from an external density meter, for example via field bus, to the measuring device electronics.

$K_\rho$ can, however, also be determined initially for the fluid directly by means of the evaluation electronics 21, if the fluid is single phase or, at least, largely homogeneous. In line with this, according to a further embodiment of the invention, therefore, the reference density value $K_\rho$ is determined using a density measured value $X_\rho,0$ likewise stored in the measuring device electronics, with the stored density measured value $X_\rho,0$ representing a density of the medium measured for the case of homogeneous medium or for the case of a medium assumed to be homogeneous. In a further development of this embodiment of the invention, the density measured value $X_\rho,0$ stored as the reference density value $K_\rho$ is used for subsequent correction of an intermediate value $X'_m$ determined earlier in the case of inhomogeneous medium. This embodiment of the invention can be applied in especially advantageous manner e.g. in the case of a dosing (blending) or bottling process, where, on the one hand, measuring tube flow conditions exist within a charge that are rapidly changing to a significant degree, especially also in the case of a measuring tube which is not completely filled, and where, however, on the other hand, principally the mass flow rate totalized over the total charge is of interest, ultimately, however, the total mass of the actually filled medium.

The aforementioned functions serving for producing the mass flow rate measured value $X_m$, which functions are symbolized by the Equations (1) to (4), can, at least in part, be implemented in an evaluation stage 54 of the measuring device electronics 50. The evaluation stage 54 can advantageously also be realized e.g. by means of the signal processor DSP or e.g. also by means of the above-mentioned microcomputer 55. The creation and implementation of corresponding algorithms corresponding to these equations or reproducing the functionality of the amplitude control circuit 51, respectively the frequency control circuit 52, as well as their translation into program code executable in such signal processors, is within the ability of those skilled in the art and thus does not require detailed explanation. Of course, the aforementioned equations can also be embodied, without more, completely or partially by means of corresponding, discretely assembled, analog and/or digital, computational circuits in the measuring device electronics 50.

The invention claimed is:

1. A coriolis mass flow meter, especially a Coriolis mass-flow/density meter, for measuring a mass flow rate of a two, or more, phase medium flowing in a pipeline, comprising:
at least one measuring tube interposed in the pipeline and through which the medium flows during operation, said at least one measuring tube having an inlet end and an outlet end;
a support means, which is fixed to said inlet end and to said outlet end of said at least one measuring tube, thus holding said at least one measuring tube in an oscillation-permitting manner;
an exciter arrangement, which causes said at least one measuring tube to execute mechanical oscillations, especially bending oscillations, during operation;
oscillation sensors for producing a first oscillation measurement signal $(x_{s1})$ representing oscillations at said inlet end of said at least one measuring tube, and a second oscillation measurement signal $(x_{s2})$ representing oscillations at said outlet end of said at least one measuring tube; and
measuring and operating electronics, which deliver an exciter current $(i_{exc})$ driving said exciter arrangement and mass flow rate measured value $(X_m)$, which represents the mass flow rate to be measured, wherein:
said measuring and operating electronics produces a first intermediate value $(X'_m)$ derived from the oscillation measurement signals $(x_{s1}, x_{s2})$ and corresponding to the mass flow rate to be measured, as well as producing a correction value $(X_K)$ for the first intermediate value $(X'_m)$, and determines the mass flow rate measured value $(X_m)$ on the basis of the first intermediate value $(X'_m)$ and the correction value $(X_K)$;
said measuring and operating electronics produces the correction value $(X_K)$ by using at least one, second intermediate value $(X_2)$, which is derived from at least one of the oscillation measurement signals $(x_{s1}, x_{s2})$ and/or from the exciter current $(i_{exc})$, and which represents a measure for an amount of a phase of the medium; and
said measuring and operating electronics has a table memory, in which a plurality of discrete preset values for the correction value $(X_K)$ are digitally stored, and for determining the correction value $(X_K)$, uses one of the preset values, which, on the basis of the second intermediate value $(X_2)$, is read out of the table memory.

2. The coriolis mass flow meter as claimed in claim 1, wherein:
said evaluation electronics delivers, derived from the first and/or the second oscillation measurement signal $(x_{s1}, x_{s2})$, a density measured value $(X_\rho)$ representing a density of the medium; and
said evaluation electronics determines the correction value $(X_K)$ using the density measured value $(X_\rho)$.

3. The coriolis mass flow meter as claimed in claim 1, wherein:
said valuation electronics determines, by means of the second intermediate value $(X_2)$ a memory address for a preset value in the table memory serving as an instantaneous correction value $(X_K)$.

4. The coriolis mass flow meter as claimed in claim 1, wherein:
the second intermediate value $(X_2)$ is determined on the basis of a scatter, determined at least over a predetermined time interval, of an amplitude of the exciter current $(i_{exc})$, an amplitude of the oscillation measurement signals $(x_{s1}, x_{s2})$, an oscillation frequency of the oscillation measurement signals $(x_{s1}, x_{s2})$, a measured density and/or the first intermediate value $(X'_m)$.

5. The coriolis mass flow meter as claimed in claim 1, wherein:
said evaluation electronics determines the mass flow rate measured value $(X_m)$ based on the functional relationship $$X_m = (1 + X_K) \cdot X'_m.$$

6. A method for producing a measured value $(X_m)$ representing a physical, measured variable, especially a mass flow rate of a medium flowing in a pipeline, by means of a Coriolis mass flow meter, especially a Coriolis mass flow rate/density meter, comprising the steps of:
causing oscillations, especially bending oscillations, of a Coriolis mass flowmeter measuring tube through which the medium flows;
registering oscillations of the measuring tube and producing a first oscillation measurement signal $(x_{s1})$ representing inlet-end oscillations and a second oscillation measurement signal $(x_{s2})$ representing outlet-end oscillations;
developing through use of the two oscillation measurement signals $(x_{s1}, x_{s2})$ a first intermediate value $(X'_m)$, especially one corresponding to the mass flow rate;
determining a second intermediate value $(X_2)$, especially with use of at least one of the two oscillation measurement signals $(x_{s1}, x_{s2})$;
producing a correction value $(X_K)$ for the intermediate value $(X'_m)$ by means of the second intermediate value $(X_2)$, which represents a measure for an amount of a phase of the medium; and
correcting the intermediate value $(X'_m)$ by means of the correction value $(X_K)$; wherein:
the correction value $(X_K)$ is determined using the second intermediate value $(X_2)$ and using a table memory, in which a plurality of discrete, preset values for the correction value $(X_K)$ are digitally stored, by identifying the preset value, which is instantaneously to be used for the correction value $(X_K)$, on the basis of the second intermediate value $(X_2)$ and reading such correction value $(X_K)$ out of the table memory.

7. The method as claimed in claim 6, further comprising the step of:
developing, on the basis of the measurement signals $(x_{s1}, x_{s2})$, a mass flow rate measured value serving as measured value $(X_m)$ and representing a mass flow rate of the medium.

8. The method as claimed in claim 6, further comprising the steps of:
developing on the basis of the measurement signals $(x_{s1}, x_{s2})$ a second measured value $(X_\rho)$ representing a density of the medium; and
developing a correction value $(X_K)$ using the second measured value $(X_\rho)$.

9. The method as claimed in claim 6, further comprising the steps of:
causing an exciter current $(i_{exc})$ to flow through an electromechanical exciter arrangement coupled mechanically with the measuring tube for causing oscillations of the measuring tube; and
determining a second intermediate value $(X_2)$, taking the exciter current $(i_{exc})$ into consideration.

10. The method as claimed in claim 6, wherein:

the second intermediate value ($X_2$) represents at least a scatter, determined for a predetermined time interval, of a measured value determined for the medium flowing in the pipeline, especially a measured mass flow rate, a measured density or a measured viscosity, and/or a scatter, determined for a predetermined time interval, of an operational parameter of the Coriolis mass flow meter, especially an amplitude of the oscillation measurement signals ($x_{s1}$, $x_{s2}$) or an oscillation frequency of the oscillation measurement signals ($x_{s1}$, $x_{s2}$).

\* \* \* \* \*